United States Patent [19]

Chapman

[11] Patent Number: 5,144,015

[45] Date of Patent: Sep. 1, 1992

[54] SYNTHESIS OF PYRAZOLE DYES

[75] Inventor: Derek D. Chapman, Rochester, N.Y.

[73] Assignee: Eastman Kodak Company, Rochester, N.Y.

[21] Appl. No.: 738,409

[22] Filed: Jul. 31, 1991

Related U.S. Application Data

[63] Continuation-in-part of Ser. No. 632,294, Dec. 21, 1990, abandoned.

[51] Int. Cl.$^5$ .................. C09B 29/036; C09B 29/09; C09B 29/30; C09B 29/36
[52] U.S. Cl. .................... 534/752; 534/792; 534/768; 534/766; 534/765; 534/791; 534/753
[58] Field of Search ............... 534/768, 753, 791, 765, 534/766, 792, 752

[56] References Cited

U.S. PATENT DOCUMENTS

| | | | |
|---|---|---|---|
| 3,133,051 | 5/1964 | Dreyer et al. | 534/765 |
| 3,336,285 | 8/1967 | Towne et al. | 534/768 |
| 3,639,384 | 2/1972 | Wearer et al. | 534/788 |
| 4,764,600 | 8/1988 | Bergmann et al. | 534/792 |

FOREIGN PATENT DOCUMENTS

| | | | |
|---|---|---|---|
| 3330155 | 3/1985 | Fed. Rep. of Germany | 534/766 |
| 3723484 | 1/1989 | Fed. Rep. of Germany | 534/765 |

OTHER PUBLICATIONS

Saunders, W. B., Chemistry of Organic Compounds 1957, pp. 479, 199.

*Primary Examiner*—Jose G. Dees
*Assistant Examiner*—Keith MacMillan
*Attorney, Agent, or Firm*—Harold E. Cole

[57] ABSTRACT

A process for preparing a 1-alkyl-3-secondary or tertiary alkyl-4-cyano-pyrazol-5-yl azo dye or a 1-alkyl-3-aryl-4-cyano-pyrazol-5-yl azo dye comprising:

a) reacting a 3-secondary or tertiary alkyl-4-cyano-5-amino pyrazole or a 3-aryl-4-cyano-5-amino pyrazole with a diazotizing reagent to form a pyrazol-5-yl diazonium salt;

b) allowing said diazonium salt to react with an aromatic coupling component to form a 3-secondary or tertiary alkyl-4-cyano-pyrazol-5-yl azo dye or a 3-aryl-4-cyano-pyrazol-5-yl azo dye; and c) reacting the product of step b) with an aklylating agent in the presence of a base to form a 1-alkyl-3-secondary or tertiary alkyl-4-cyano-pyrazol-5-yl azo dye or a 1-alkyl-3-aryl-4-cyano-pyrazol-5-yl azo dye.

6 Claims, No Drawings

SYNTHESIS OF PYRAZOLE DYES

This application is a continuation-in-part of U.S. application Ser. No. 632,294, filed Dec. 21, 1990 now abandoned.

This invention relates to a process for preparing pyrazole dyes. More particularly, the process relates to preparing 1-alkyl-3-secondary or tertiary alkyl-4-cyano-pyrazol-5-yl azo dyes or 1-alkyl-3-aryl-4-cyano-pyrazol-5-yl azo dyes.

Pyrazole dyes have previously been prepared by processes such as disclosed in U.S. Pat. Nos. 3,336,285 and 3,639,384 and Br 1,566,985. In the above U.S. patents, 1-alkyl-4-cyano-pyrazol-5-yl azo dyes are prepared by diazotization and coupling of a 1-alkyl-4-cyano-5-amino pyrazole. Such "diazo components are obtainable only in moderate yield and are difficult to diazotize and couple to produce dyes in good yields and high purity" [Weaver and Shuttleworth, Dyes and Pigments 3, 81 (1982)].

In Br. 1,566,985, 1-alkyl-3-alkyl or aryl-4-cyano-pyrazol-5-yl azo dyes are prepared by diazotization and coupling of a 1-alkyl-3-alkyl or aryl-4-halogeno-5-amino pyrazole with an aromatic coupling component followed by subsequent displacement of the 4-halogen substituent with cyanide. This displacement reaction involves the use of a heavy metal cyanide such as CuCN or $Zn(CN)_2$. The use of cyanide is potentially hazardous and the use of heavy metals presents potential waste disposal problems.

It would be desirable to provide a process for preparing such dyes which give pure dyes without isomeric mixtures in high yields without using hazardous or toxic reagents such as cyanide or heavy metals.

These and other objects are achieved in accordance with this invention which comprises a process for preparing a 1-alkyl-3-secondary or tertiary alkyl-4-cyano-pyrazol-5-yl azo dye or a 1-alkyl-3-aryl-4-cyano-pyrazol-5-yl azo dye comprising:

(a) reacting a 3-secondary or tertiary alkyl-4-cyano-5-amino pyrazole or a 3-aryl-4-cyano-5-amino pyrazole with a diazotizing reagent to form a pyrazol-5-yl diazonium salt;

(b) allowing said diazonium salt to react with an aromatic coupling component to form a 3-secondary or tertiary alkyl-4-cyano-pyrazol-5-yl azo dye or a 3-aryl-4-cyano-pyrazol-5-yl azo dye; and (c) reacting the product of step b) with an alkylating agent in the presence of a base to form a 1-alkyl-3-secondary or tertiary alkyl-4-cyano-pyrazol-5-yl azo dye or a 1-alkyl-3-aryl-4-cyano-pyrazol-5-yl azo dye.

In a preferred embodiment of the invention, the diazotizing reagent employed in step (a) is sodium nitrite in dilute aqueous hydrochloric acid. Other diazotizing reagents which could be used include nitrosyl sulfuric acid or isopentyl nitrite in trifluoroacetic acid.

In another preferred embodiment of the invention, the aromatic coupling component employed in step (b) is 2-methoxy-5-acetamido-N,N-diethylaniline. Other coupling components which could be used include N,N-diethyl-m-toluidine, N-benzyl-N-ethylaniline, or 1,2,2,4,7-pentamethyl-tetrahydroquinoline.

In still another preferred embodiment of the invention, the alkylating agent employed in step c) is methylsulfate or chloroacetone. Other alkylating agents which could be used include methyl iodide, benzyl bromide, phenacyl bromide, propyl iodide, ethyl tosylate or ethyl acrylate.

The base employed in step c) may be potassium hydroxide, tetrabutyl ammonium hydroxide, diisopropylethylamine, etc.

The above reactions may be illustrated in the following manner:

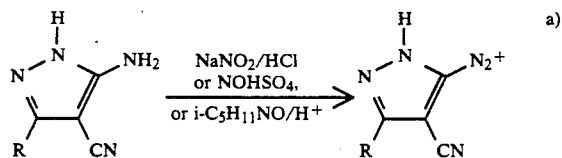

R is t-butyl, isopropyl, phenyl, etc.

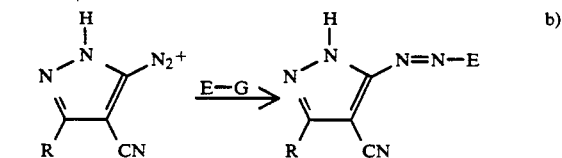

E is a substituted aminophenyl, tetrahydroquinolyl, julolidinyl, aminothiazole, indole, etc. and G is any group capable of displacement by a diazonium salt such as hydrogen.

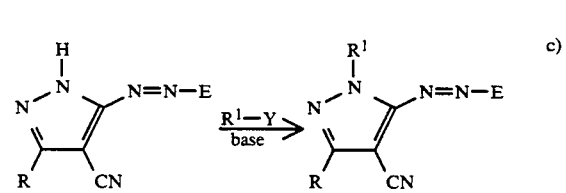

$R^1$ in the above formula represents an alkyl group having from 1 to about 6 carbon atoms or an allyl group; or such alkyl or allyl groups substituted with one or more groups such as alkyl, aryl, alkoxy, aryloxy, halogen, nitro, cyano, thiocyano, acyloxy, acyl, alkoxycarbonyl, alkoxycarbonyloxy, carbamoyloxy, imido, alkylsulfonyl, arylsulfonyl, alkylthio, arylthio, trifluoromethyl, etc., e.g., methyl, ethyl, propyl, isopropyl, butyl, pentyl, hexyl, methoxyethyl, cyano, methoxycarbonyl, cyclohexyl, cyclopentyl, phenyl, pyridyl, naphthyl, thienyl, pyrazolyl, p-tolyl, p-chlorophenyl, methylthio, butylthio, benzylthio, methanesulfonyl, pentanesulfonyl, methoxy, ethoxy, imidazolyl, naphthyloxy, furyl, p-tolylsulfonyl, p-chlorophenylthio, ethoxy-carbonyl, methoxyethoxycarbonyl, phenoxycarbonyl, acetyl, benzoyl, N,N-dimethyl-carbamoyl, dimethylamino, morpholino, pyrrolidino etc.;

Y represents halogen or $-OSO_2R^2$, and $R^2$ represents an alkyl group such as those listed above for $R^1$; an aryl group such as phenyl or p-tolyl; or $OR^1$.

In another preferred embodiment of the invention, an additional step d) is employed which comprises reducing an N-phenacyl or N-acetonyl pyrazolyl azo dye produced by steps a)-c) with an alkali metal borohydride reagent in order to produce the corresponding substituted N-hydroxyethyl dye.

By use of the above process, it is possible to prepare 1-alkyl-3-secondary or tertiary alkyl-4-cyano-pyrazol-5-yl azo dyes or 1-alkyl-3-aryl-4-cyanopyrazol-5-yl azo dyes in good yield and high purity. Alkylation of 4- cyanopyrazolyl azo dyes lacking a secondary or tertiary alkyl or aryl group in the 3-position leads to a mixture of pyrazol-3-yl and pyrazol-5-yl azo dyes. The pyrazol-3-yl azo dyes are greatly different in hue (absorbing light at a much lower wavelength) and difficult to separate from the more desirable pyrazol-5-yl azo dyes. Use of the above process essentially eliminates the formation of the pyrazol-3-yl azo dyes. Also, the preparation of 1,3-dialkyl or 1-alkyl-3-aryl-4-cyano-pyrazol-5-yl azo dyes directly by diazotization and coupling of the corresponding 1-alkyl-5-amino pyrazoles is impractical due to the extremely low dye yields. In addition, the alkyl hydrazines required to produce the 1-alkyl-4-cyano-5-amino pyrazoles are limited in structural variety and are often difficult to prepare.

Dyes prepared by the above process are useful as textile dyes, ink jet dyes, writing inks, photographic filter dyes, thermal printing dyes, etc. In a preferred use of dyes prepared according to the invention, they are used to prepare a thermal printing sheet as shown in copending U.S. Ser. No. 606,402, filed Oct. 31, 1990, the disclosure of which is hereby incorporated by reference.

The 3-secondary or tertiary alkyl-4-cyano-5-aminopyrazole and 3-aryl-4-cyano-5-aminopyrazole starting materials employed in the process of the invention can be prepared by the methods disclosed in U.S. Pat. No. 3,336,285 and Heterocycles, 20, 519 (1983), the disclosures of which are hereby incorporated by reference.

The following dyes may prepared according to the process of the invention:

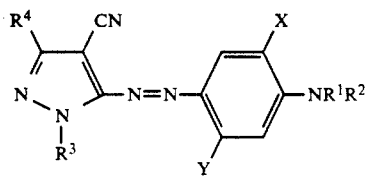

The following examples are provided to illustrate the invention.

EXAMPLE 1

Synthesis of Compound 1

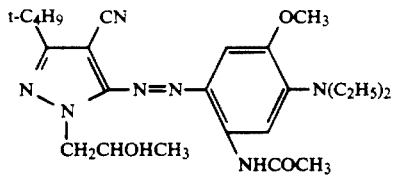

(a) Pivaloylmalononitrile intermediate

Pivaloyl chloride (60 g) and malononitrile (33 g) were dissolved in methylene chloride (500 ml) and were placed in a flask equipped with a stirrer and a dropping funnel. Triethylamine (100 g) was added slowly with cooling over a period of 45 minutes. The triethylamine hydrochloride was removed and the filtrate was concentrated to about half volume. The solution was poured onto ice, acidified strongly with concentrated hydrochloric acid and the resulting product was filtered off and air dried.

(b) 3-Chloro-2-cyano-4,4-dimethyl-2-pentenenitrile intermediate

Phosphorous pentachloride (86 g) was added slowly to a stirred suspension of the above pivaloylmalononitrile intermediate (a) (57 g) in methylene chloride (500 ml) and was allowed to stir at room temperature for 16 hours. Sulfur dioxide was passed through the solution for 20 minutes and the solvent was removed on a rotary evaporator. The residue was poured onto ice and filtered. The product was used without further purification.

(c) 5-Amino-4-cyano-3-t-butylpyrazole intermediate

Hydrazine (40 g) was dissolved in ethanol (100 ml) and was placed in a flask equipped with a condenser, a dropping funnel, a thermometer and a magnetic stirrer. A solution of the above pentenenitrile intermediate (b) (80 g) in ethanol (300 ml) was added with stirring at a rate that the temperature did not rise above 35° C. The reaction mixture was then gently refluxed for 90 minutes, the solvent was partially removed and the residue was treated with water. The product was filtered off and dried.

| Cmpd | $R^1$ | $R^2$ | $R^3$ | $R^4$ | X | Y |
|---|---|---|---|---|---|---|
| 1 | $C_2H_5$ | $C_2H_5$ | $CH_2CHOHCH_3$ | $t\text{-}C_4H_9$ | $CH_3O$ | $NHCOCH_3$ |
| 2 | $CH_2=CHCH_2$ | $CH_2=CHCH_2$ | $CH_2CHOHCH_3$ | $t\text{-}C_4H_9$ | $CH_3O$ | $NHCOCH_3$ |
| 3 | $C_2H_5$ | $C_2H_5$ | $CH_2CHOHCH_3$ | $t\text{-}C_4H_9$ | H | $CH_3$ |
| 4 | $C_2H_5$ | $C_2H_5$ | $CH_2CHOHCH_3$ | $t\text{-}C_4H_9$ | H | H |
| 5 | $C_2H_5$ | $C_2H_5$ | $CH_3$ | $t\text{-}C_4H_9$ | H | $C_2H_4OH$ |
| 6 | $C_2H_5$ | $C_2H_5$ | $CH_3$ | $t\text{-}C_4H_9$ | H | $C_2H_4\text{—}NHCOCH_3$ |
| 7 | $C_2H_5$ | $C_2H_5$ | $CH_3$ | $t\text{-}C_4H_9$ | $CH_3O$ | $NHCOCH_3$ |
| 8 | $C_2H_5$ | $C_2H_5$ | $CH_2CONHCH_3$ | $t\text{-}C_4H_9$ | H | $NHCOCH_3$ |
| 9 | $C_2H_5$ | $C_2H_5$ | $CH_3$ | $C_{10}H_9$ | H | $CH_3$ |
| 10 | H | $i\text{-}C_3H_7$ | $C_6H_5CH_2$ | $i\text{-}C_3H_7$ | $C_2H_4OH$ | Cl |
| 11 | $n\text{-}C_3H_7$ | $n\text{-}C_3H_7$ | $C_2H_4Cl$ | $t\text{-}C_5H_{11}$ | $CH_3$ | $NHCOCH_2OH$ |
| 12 | $C_6H_5CH_2$ | $C_2H_5$ | $C_2H_4NH\text{—}SO_2CH_3$ | $C_6H_5$ | $C_2H_5O$ | $NHSO_2CH_3$ |

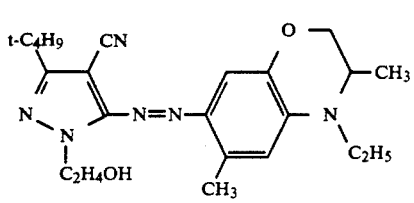

(d) 5-Acetamido-4-(3-t-butyl-4-cyano-5-pyrazolylazo)-2-methoxy-N,N-diethylaniline intermediate The above aminopyrazole intermediate (c) (0.8 g) was dissolved in a mixture of concentrated hydrochloric acid (1.5 ml) and water (5 ml) and the solution was cooled to below 5° C. Sodium nitrite (0.35 g) was added in portions with forceful stirring After 10 minutes acetic acid (5 ml) was added to dissolve the precipitated diazonium salt.

5-Acetamido-2-methoxy-N,N-diethylaniline (1.15 g) was dissolved in aqueous acetic acid (1:1 10 ml) and sodium acetate (5 g) was added. The solution was cooled in ice and the above diazonium solution was added slowly. After 15 minutes the solution was diluted with water and the precipitated dye was filtered off. Yield was 1.4 g.

(e) 4-[3-t-butyl-4-cyano-1-(2-hydroxypropyl)-5-pyrazolylazo]-5-acetamido-2-methoxy-N,N-diethylaniline (Dye 1)

The above pyrazolylazodiethylaniline intermediate dye (d) (41 g) was dissolved in acetone (800 ml) and a solution of potassium hydroxide (6 g) in water (100 ml) was added. The mixture was stirred while tetrabutylammonium iodide (2 g) and chloroacetone (10 g) were added. The course of the reaction was followed by thin-layer chromatography (silica gel: ether/ligroin 2:1). After 5 hours, additional potassium hydroxide (2 g) and chloroacetone (2 g) were added and the mixture was allowed to stir overnight. Water (800 ml) was added slowly with stirring at such a rate that the product precipitated in a filterable form. The product was filtered off, washed with 2:1 water/acetone (500 ml) and then dried at 50° C.

The product was added to methanol (800 ml) and stirred vigorously while an excess of sodium borohydride (5 g) was added. There was a slight exotherm and gas evolution occurred. The course of the reaction was followed by thin-layer chromatography. After 2 hours, acetone (20 ml) was added followed by slow addition of water (700 ml). After being cooled the product was filtered off, washed with water and dried. Yield was 37 g.

EXAMPLE 2

Synthesis of Compound 7

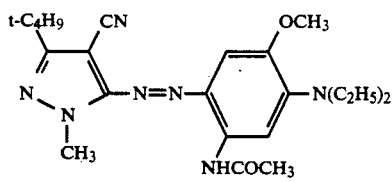

The pyrazolylazodiethylaniline intermediate (d) of Example 1 (1.2 g) was dissolved in acetone (5 ml) and potassium hydroxide (0.3 g) in water (3 ml) was added. Dimethyl sulfate (1 ml) was added and the mixture was stirred at room temperature until the methylation was complete by thin-layer chromatography. Dilution with water precipitated the dye. Yield was 0.9 g.

EXAMPLE 3

Comparative Examples

The compounds illustrated below with the substituents shown in the Table were prepared in an analogous manner to Examples 1 and 2.

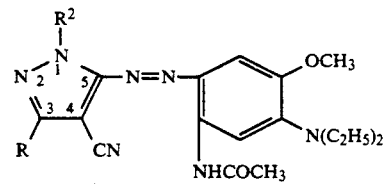

TABLE

| R | $R^2$ | % Unwanted Isomer |
| --- | --- | --- |
| Phenyl | Methyl | 5 |
| Phenyl | Ethyl | 5 |
| Isopropyl | Methyl | <5 |
| Methyl (Control) | Ethyl | 25–30 |
| Ethyl (Control) | Ethyl | 15–20 |
| t-Butyl | Methyl | <5 |

The above results show that a t-butyl or isopropyl group in the 3-position (R) allows alkylation to occur on the desired nitrogen of the pyrazole. Ethylation of the corresponding 3-methyl derivative gives a mixture containing about 25–30% of the unwanted isomer. The 3-ethyl analog gave less of the undesired isomer on ethylation, 15–20%, but the selectivity was not enough to provide a viable route to the desired dye. On the other hand, the 3-isopropyl and 3-t-butyl derivatives gave almost exclusively methylation on the desired nitrogen as determined by nmr analysis. The same result was obtained on both ethylation and methylation of the 3-phenyl analog with only a trace of the unwanted isomer being formed.

The invention has been described in detail with particular reference to preferred embodiments thereof, but it will be understood that variations and modifications can be effected within the spirit and scope of the invention.

What is claimed is:

1. A process for preparing a 1-alkyl-3-secondary or tertiary alkyl-4-cyano-pyrazol-5-yl azo dye or a 1-alkyl-3-aryl-4-cyano-pyrazol-5-yl azo dye comprising:
    (a) reacting a 3-secondary or tertiary alkyl-4-cyano-5-amino pyrazole or a 3-aryl-4-cyano-5-amino pyrazole with a diazotizing reagent to form a pyrazol-5-yl diazonium salt;
    (b) allowing said diazonium salt to react with an aromatic coupling component to form a 3-secondary or tertiary alkyl-4-cyano-pyrazol-5-yl azo dye or a 3-aryl-4-cyano-pyrazol-5-yl azo dye; and
    (c) reacting the product of step b) with an alkylating agent in the presence of a base to form a 1-alkyl-3-secondary or tertiary alkyl-4-cyano-pyrazol-5-yl azo dye or a 1-alkyl-3-aryl-4-cyano-pyrazol-5-yl azo dye.

2. The process of claim 1 wherein said diazotizing agent in step a) is sodium nitrite in dilute aqueous hydrochloric acid.

3. The process of claim 1 wherein said aromatic coupling component in step b) is 2-methoxy-5-acetamido-N,N-diethylaniline.

4. The process of claim 1 wherein said alkylating agent in step c) is methylsulfate or chloroacetone.

5. The process of claim 1 wherein the dye which is formed is 2-methoxy-4-[1-methyl-3-(tertbutyl)-4-cyanopyrazol-5-ylazo]-5-acetamido-N,N-diethylaniline or 2-methoxy-4-[1-acetonyl-3-(tertbutyl)-4-cyanopyrazol-5-ylazo]-5-acetamido-N,N-diethylaniline.

6. The process of claim 1 wherein a step (d) is employed which comprises reducing the N-acetonyl pyrazolyl azo dye produced by steps (a)–(c) with an alkali metal borohydride reagent.

* * * * *